No. 830,316. PATENTED SEPT. 4, 1906.
E. T. GREENFIELD.
JUNCTION BOX.
APPLICATION FILED OCT. 10, 1904.

Witnesses
Edward G. Rowland
M. F. Keating

Inventor
Edwin T. Greenfield
By his Attorney
Charles J. Kintner.

UNITED STATES PATENT OFFICE.

EDWIN T. GREENFIELD, OF MONTICELLO, NEW YORK.

JUNCTION-BOX.

No. 830,316.　　　　Specification of Letters Patent.　　　　Patented Sept. 4, 1906.

Application filed October 10, 1904. Serial No. 227,866.

*To all whom it may concern:*

Be it known that I, EDWIN T. GREENFIELD, a citizen of the United States, residing at Monticello, county of Sullivan, and State of New York, have made a new and useful Invention in Junction-Boxes, of which the following is a specification.

My invention is directed particularly to improvements in house junction-boxes and means for connecting the inleading ends of armored conduits or cables thereto; and it has for its object the provision of means whereby the ends of armored conduits or cables may be secured to a metallic junction-box by clamping the same against one of the inner walls or faces thereof, said clamping means being located wholly within the box and readily accessible when the parts are being put together.

In prior patents granted to me on the 12th day of June, 1900, and numbered 651,484, and January 8, 1901, numbered 665,676, I have disclosed two-part junction-boxes in which the ends of armored conduits are adapted to be held between the parts of a two-part box and rigidly secured to one part by means located wholly within the box, and the present invention is an improvement upon the inventions disclosed in the before-mentioned patents in that the box in the present instance is substantially a dustproof box and is provided with openings in its sides for the reception of the conduits, the latter being secured to the interior thereof by clamping means which is readily accessible when the conduits or cables and the box are being united.

For a full and clear understanding of my invention, such as will enable others skilled in the art to construct and use the same, reference is had to the accompanying drawings, in which—

Figure 1:
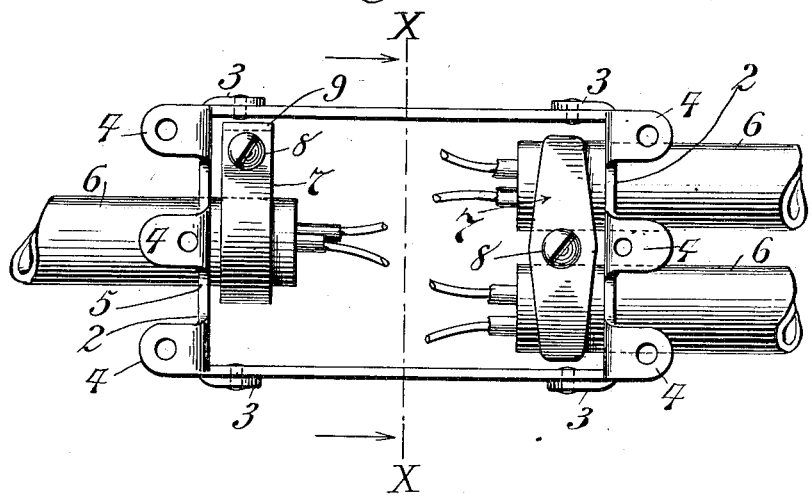
Figure 2:
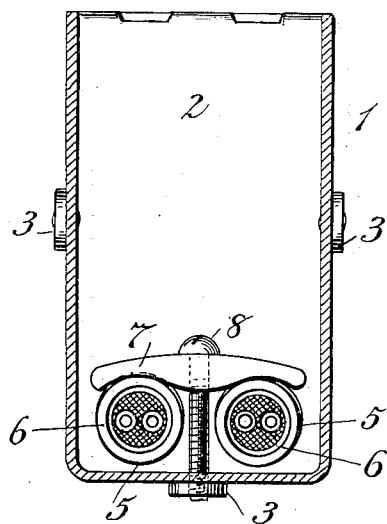

Figure 1 is a plan view of my novel junction-box provided with my improved means for securing the ends of inleading armored conduits thereto, and Fig. 2 is a transverse sectional view taken through Fig. 1 on the line X X and as seen looking thereat from left to right in the direction of the arrows, the armored conduits and their inclosed insulated cables and the means for securing the same to the box being shown in elevational view.

Referring to the drawings in detail, 1 1 represent the two sides and bottom of a junction-box bent in U form of one piece of relatively thin flexible metal, such as sheet-iron, and 2 2 the ends thereof secured to the former by bent-over lugs or ears 3 3 3 and rivets in a manner which will be obvious on inspection of the drawings.

4 4 4 4 4 4 represent horizontally-disposed lugs or ears integral with the ends 2 2 and located at the upper end of the box when completed, their function being to secure the junction-box either to a ceiling, a wall, or other point of support by screws extending therethrough. In the construction of such a box the sides and bottom are bent in U form in the manner described and the ends 2 2 are struck up with the respective sets of lugs or ears 3 3 and 4 4 bent in opposite directions, the inleading holes or openings 5 5 5 for the conduits being punched or struck out at the same operation and of the proper diameter to receive the inleading ends of armored conduits or cables 6 6 6.

7 7 are metal clamps, the same being provided in one instance with a hole in its middle, as shown in Fig. 2, for receiving a clamping-screw 8 and adapted to bear at its opposite ends upon the ends of two inleading conduits, and in the other instance with a downwardly-extending leg 9, the screw 8 being located between said leg and the bearing or clutching end of the clamp.

In wiring a building the parts are put together as follows: The ends of the armored conduits or cables 6 6 6 are inserted through the openings 5 5 within the box to a proper distance, as shown, and the clamps 7 are placed in position so as to bear upon them, either doubly, as shown at the right of Fig. 1 and in elevational view in Fig. 2, or singly, as shown at the left of Fig. 1. The clamping-screws 8 are then secured in place through the bottom of the box in the manner shown and so as to effectually grip or hold the parts together. The wiring of the conductors in the box is then effected in the usual manner, and it is secured either to the ceiling, side wall, or other point of support by screws extending through the lugs or ears 4 4 4 on each side.

I am aware that metallic junction-boxes have heretofore been made by bending or joining strips of sheet metal into U form and uniting the edges thereof together by a seam or by rivets, the ends being similarly secured; but I am not aware that any one has heretofore constructed a junction-box in the manner hereinbefore described by joining three pieces of sheet metal together through the agency of lugs or ears upon two of the pieces and rivets passing through said lugs or ears and the three pieces. I am also aware that various means have heretofore been utilized for effecting the union between the inleading ends of armored conduits or cables and junction-boxes, both in the nature of set-screws, clamping or clutching means, &c., and I make no claim hereinafter broad enough to include generically such structural devices, my most generic claim being to means located wholly within the box and in such manner as to be wholly concealed therein and to effect a secure mechanical union between the ends of the conduits and the interior of the box with which they are connected, the same being so arranged as to be readily accessible in a box of any depth or of varying proportions after it has been put in place on the wall or ceiling, the clamping effect being between one surface of the box and clamping means which receives the ends of the conduits between it and the box, such an arrangement making it practically impossible for unauthorized persons to interfere or tamper with the interconnecting means and also constituting a simple, neat, and efficient union of the parts which are wholly concealed within the box.

I am aware that a junction-box for electric house-conduits has heretofore been devised in which inleading conduits are secured in openings in the ends of the box by a duplex clamp resting upon the ends of the conduits and secured internally to the end of the box by a screw having an inclined head extending through an opening in the middle of the clamp. With such an arrangement, however, where the conduit-boxes are of considerable depth, it is not possible to secure the box first to the wall or ceiling and then adjustably secure the clamp against the ends of the conduits. My invention makes it possible to accomplish this result with boxes of any depth, thereby enabling a constructor to first secure the junction-boxes at various points and afterward effect a permanent union between them, and in this important feature is found the essence of my invention.

Having thus described my invention, what I claim, and desire to secure by Letters Patent of the United States, is—

1. A junction-box provided with inleading holes or openings extending therethrough at points relatively near its bottom, and a screw-threaded opening in the bottom; in combination with a clamp adapted to extend laterally over each opening and a clamping-screw adapted to extend through said clamp and into the before-mentioned screw-threaded opening in the bottom.

2. A junction-box provided with pairs of conduit-openings extending into the same at points relatively near its bottom; a screw-threaded opening located in the bottom of the box between each of the before-mentioned openings; a clamp adapted to extend laterally over each pair of openings and a screw adapted to extend through the clamp and into the screw-threaded opening.

3. A junction-box constructed of three pieces of sheet metal, one piece constituting the bottom and sides thereof and the other two pieces the ends; said ends being provided with integral lugs secured to the body part of the box, and additional integral lugs for securing the bottom of the box against a ceiling or wall; conduit-openings extending into the box at points relatively near its bottom; in combination with screw-threaded openings in the bottom of the box adjacent to the conduit-openings and a clamp adapted to extend laterally over each opening and provided with a screw adapted to be secured in place through the clamp and in the corresponding screw-hole in the bottom of the box, whereby all of said parts may be readily secured permanently in position.

In testimony whereof I have signed my name to this specification in the presence of two subscribing witnesses.

EDWIN T. GREENFIELD.

Witnesses:
C. J. KINTNER,
M. F. KEATING.